United States Patent
Kim et al.

(10) Patent No.: US 6,570,863 B1
(45) Date of Patent: May 27, 2003

(54) APPARATUS AND METHOD FOR ADAPTIVE CDMA DETECTION BASED ON CONSTRAINED MINIMUM MEAN SQUARED ERROR CRITERION

(75) Inventors: Seong-Rag Kim, Taejon (KR); Young-Gyun Jeong, Taejon (KR); In-Kyeong Choi, Taejon (KR); Seo-Young Lee, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/441,382

(22) Filed: Nov. 16, 1999

(30) Foreign Application Priority Data

Dec. 2, 1998 (KR) .......................................... 98-52648

(51) Int. Cl.[7] ............................................. H04B 7/216
(52) U.S. Cl. ...................... 370/342; 370/335; 375/147; 375/340; 375/350
(58) Field of Search ................................ 375/147, 340; 375/350; 370/335, 342

(56) References Cited

U.S. PATENT DOCUMENTS

| | | | |
|---|---|---|---|
| 5,268,927 A | | 12/1993 | Dimos et al. |
| 5,343,496 A | | 8/1994 | Honig et al. |
| 5,414,699 A | * | 5/1995 | Lee ............................. 370/18 |
| 5,425,059 A | | 6/1995 | Tsujimoto |
| 5,870,378 A | * | 2/1999 | Huang et al. ............... 370/209 |
| 5,991,332 A | * | 11/1999 | Lomp et al. ................ 375/206 |
| 6,205,166 B1 | * | 3/2001 | Maruta et al. .............. 375/130 |

OTHER PUBLICATIONS

Rappaport, Wireless Communications, 1996, Prentice Hall Publications, pp. 299–324.*

Proakis, Digital Communications, 1995, McGraw Hill, pp. 607–620, 649–654.*

Latva–aho, "Modified Adaptive LMMSE Receiver for DS–CDMA Systems in Fading Channels," 1997, IEEE, pp. 554–557.*

Miller, "Modified LMMSE Receiver for DS–CDMA Systems in Fading Channels, " 1996, IEEE, pp. 898–902.*

Madhow, "MMSE Interference Suppression for DSSS CDMA," 1994, pp. 3178–3188.*

IEEE 1997, "Modified Adaptive LMMSE Receiver for DS–CDMA Systems i nFAding Channels", M. Latva–aho and M. Juntti, 5 pages.

IEEE 1996, "A Modified MMSE Receiver For Detection of DS–CDMA Signals in Fading Channels", S. Miller and A. Barbosa, 5 pages.

IEEE 1994, MMSE Interference Suppression for Direct–Sequence Spread–Spectrum CDMA, U. Madhow and M. Honig, 11 pages.

* cited by examiner

*Primary Examiner*—Nay Maung
*Assistant Examiner*—Tanmay Lele
(74) *Attorney, Agent, or Firm*—Blakely Sokoloff Taylor & Zatman

(57) ABSTRACT

An adaptive apparatus and method for detecting a receiving signal employing constrained minimum mean square error (MMSE) criterion as an adaptive algorithm for detecting CDMA receiving signal. The apparatus comprises an adaptive filtering means; a channel estimating means; a signal restoring means; a selecting means; a reference signal generating means; an error calculating means; and a tap weight controlling means. In the apparatus, an adaptive filter can be normally operated even if compensating a phase and amplitude of a channel at the same time.

21 Claims, 4 Drawing Sheets

APPARATUS AND METHOD FOR ADAPTIVE CDMA DETECTION BASED ON CONSTRAINED MINIMUM MEAN SQUARED ERROR CRITERION

BACKGROUND OF THE INVENTION

The present invention relates to a technique for detecting a receiving signal in radio communication using code division multiple access (CDMA), more particularly, to an apparatus and method for adaptive CDMA detection based on constrained minimum mean squared error criterion.

A typical adaptive Minimum Mean Squared Error (MMSE) apparatus for detecting a receiving signal has a good performance in a fixed channel environment and a simple structure, while its performance is severely degraded in a fading channel environment. This is due to the fact that the adaptive filter cannot be adapted to the rapid change of a channel phase and amplitude.

There are several methods to solve the problem. Some techniques of the methods have been proposed in articles, for example, S. L. Miller and A. N. Barbosa, "A modified MMSE Receiver for Detection of DS-COMA Signals in Fading Channels", Proc.MILCOM'96, pp.898–902; and M. Latva-abo and M. Juntti, "Modified Adaptive LMMSE Receiver for DS-CDMA Systems in Fading Channels", Proc.PIMRC'97, pp.554–558.

The first technique relates to reducing the channel load by compensating a phase variation component of channel for an input signal of an adaptive filter. But, since the method compensates only a phase component of channel, the performance of the adaptive filter decreases in case of a large variation of an amplitude component of channel.

The second technique relates to simultaneously compensating a phase and amplitude for a reference signal for an adaptive filter. In this case, using an input signal of the adaptive filter included in a component of Multiple Access Interference (MAI) performs the channel estimation for compensation. If the channel is estimated by using a MAL removed input signal of adaptive filter and a phase and amplitude are compensated by the channel estimation, as described FIG. 4 (see A in FIG. 4), all the tap weights of the adaptive filter converge to zero. Thus, the receiving apparatus cannot be operated.

Accordingly, an apparatus in which a channel is estimated by using an output signal of an adaptive filter, and a phase and amplitude are compensated by the channel estimation, a tap weight of an adaptive does not converge to zero, and operates normally is requested.

SUMMARY OF THE INVENTION

The object of the present invention is to provide an adaptive apparatus for detecting a receiving signal employing constrained minimum mean square error (MMSE) criterion as an adaptive algorithm for detecting a receiving signal in CDMA system, in which an adaptive filter can be normally operated even if compensating a phase and amplitude of a channel at the same time.

Also, the present invention is to provide an adaptive method for detecting a receiving signal employing constrained minimum mean square error (MMSE) criterion as an adaptive algorithm for detecting a receiving signal CDMA system, in which an adaptive filter can be normally operated even if compensating a phase and amplitude of a channel at the same time.

Further, the present invention is to provide a recording media for implementing an adaptive method for detecting a receiving signal employing constrained minimum mean square error (MMSE) criterion as an adaptive algorithm for detecting a receiving signal in CDMA system, in which an adaptive filter can be normally operated even if compensating a phase and amplitude of a channel at the same time.

To accomplish the objects, the present invention provides an adaptive apparatus for detecting a receiving signal in CDMA communication system comprising: an adaptive filtering means for filtering a complex receiving signal according to a tap weight controlled by a predetermined period; a channel estimating means for estimating a phase component and a amplitude component of a particular user channel by using the output signal of the adaptive filtering means; a signal restoring means for restoring an original signal transmitted from the particular user by using the channel estimated signal from the channel estimating means and the filtered receiving signal from the adaptive filtering means; a selecting means for selecting and providing either the restored signal from the signal restoring means or a known training signal; a reference signal generating means for generating a reference signal by using the channel estimated signal from the channel estimating means and the selected signal from the selecting means; an error calculating means for calculating an error between the filtered receiving signal from the adaptive filtering means and the reference signal from the reference signal generating means by comparing the signals; and a tap weight controlling means for controlling the tap weight of the adaptive filtering means based on constrained minimum mean square error (MMSE) criterion.

Also, the present invention provides an adaptive method for detecting a receiving signal in CDMA communication system comprising the steps of: a first step for removing an interference signal from a receiving signal according to a tap weight of an adaptive filter controlled by a predetermined period; a second step for estimating a phase component and a amplitude component of a particular user channel by using the filtered complex receiving signal; a third step for restoring an original signal transmitted from the particular user from the filtered complex receiving signal by using the channel estimated value from the second step, wherein the filtered complex receiving signal is estimated as a receiving signal transmitted from the particular user; a forth step for selecting and providing either the restored signal from the third step or a known training signal; a fifth step for generating a reference signal by using the channel estimated signal from the second step and the selected signal from the forth step; a sixth step for calculating an error between the filtered complex receiving signal and the reference signal by comparing the signals; and a seventh step for re-establishing the tap weight of the adaptive filtering means based on constrained minimum mean square error(MMSE) criterion, then iterating the steps from the first step.

And, the second step comprises the steps of: a pilot signal extracting step for extracting a known pilot signal with a predetermined period included in the filtered receiving signal from the first step; a first operating step for multiplying the pilot signal by a predetermined value; a second operating step for adding all the output value of the first operating step in a predetermined period; a third operating step for finding and outputting the mean by dividing the sum of the second operating step into the number of output value of the first operating step.

And, the third step comprises the steps of: a forth operating step for multiplying the output signal of the second step by the output signal of the first step; a real value extracting step for extracting a real component from the output value of the forth step; and a bit value determining step for determining a bit value of the extracted real value from the real value extracting step.

And, the sevenths step comprises the steps of: a pseudo noise(PN) generating step for providing a pseudo noise(PN); a fifth operating step for multiplying the receiving signal by the PN signal; a sixth operating step for multiplying the output signal of the fifth operating step by the PN signal; a seventh operating step for subtracting the output signal of the sixth operating step from the receiving signal; a eighth operating step for multiplying the complex conjugate of the error signal from the sixth operating step by the output signal of the seventh operating step; a ninth operating step for multiplying the step size determining the controlling period of the tap weight by the output signal of the eighth operating step; a tenth operating step for adding an operated output signal immediately before to the output signal of the ninth operating step; a eleventh operation step for adding the PN signal to the output signal of the tenth operating step, and establishing the sum as a new tap weight of the adaptive filter.

Further, the present invention provides a recording media read by a computer, in which is recorded with a program for implementing functions in an adaptive apparatus for detecting a receiving signal in CDMA communication system including a processor, the functions comprising: a first function for removing an interference signal from a receiving signal according to a tap weight of an adaptive filter controlled by a predetermined period; a second function for estimating a phase component and a amplitude component of a particular user channel by using the filtered complex receiving signal; a third function for restoring an original signal transmitted from the particular user from the filtered complex receiving signal by using the channel estimated value of the second function, wherein the filtered complex receiving signal is estimated as a receiving signal transmitted from the particular user; a forth function for selecting and providing either the restored signal by the third function or a known training signal; a fifth function for generating a reference signal by using the channel estimated signal performed by the second function and the selected signal by the forth function; a sixth function for calculating an error between the filtered complex receiving signal and the reference signal by comparing the signals; and a seventh function for re-establishing the tap weight of the adaptive filter based on constrained minimum mean square error (MMSE) criterion, then iterating the functions from the first function.

BRIEF DESCRIPTION OF THE DRAWING

The object, features and advantages of the present invention are understood within the context of the description of the preferred embodiment as set forth below. The description of the preferred embodiment is understood within the context of accompanying drawing. Which form a material part of this disclosure, wherein.

DESCRIPTION OF THE PREFERRED EMBODIMENT

The description of the preferred embodiment as set forth below.

Figure 1:
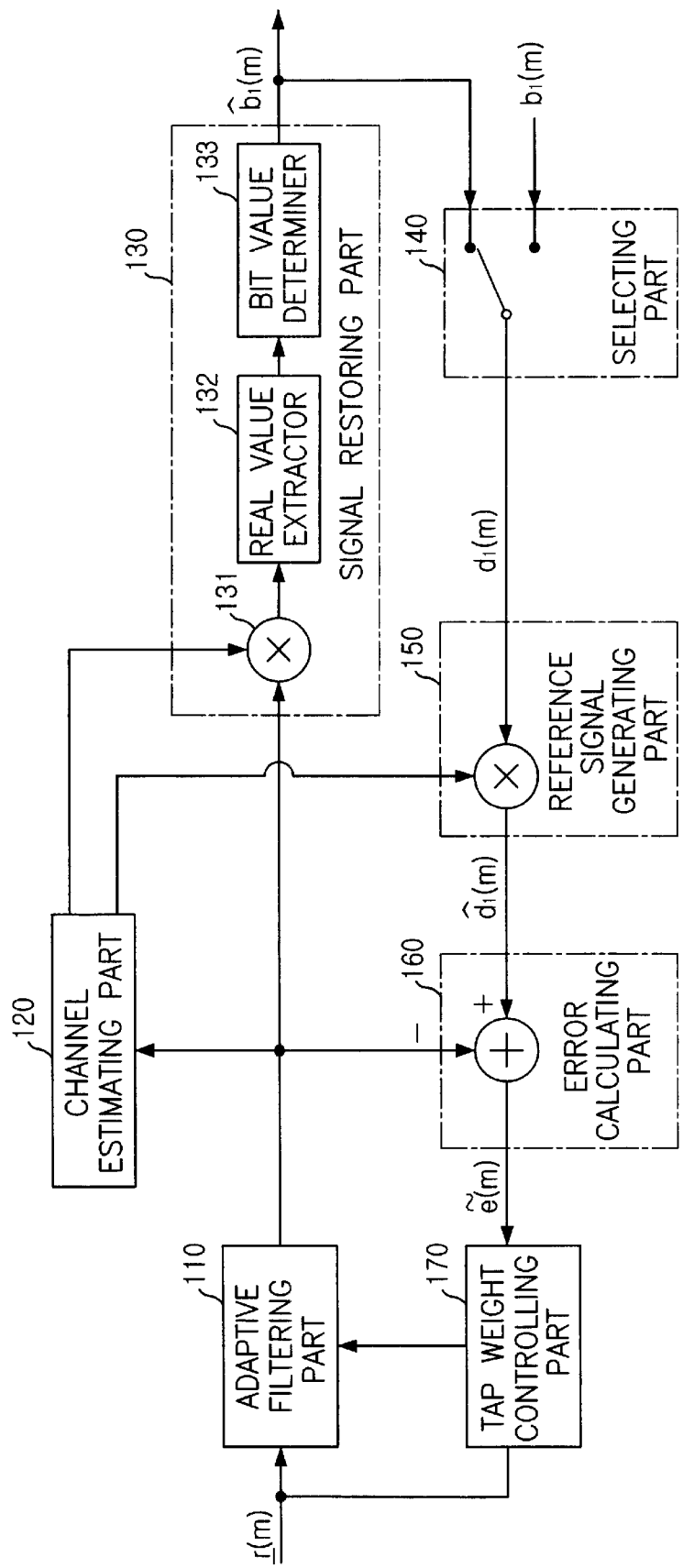
FIG. 1 is a block diagram depicting an apparatus for adaptive CDMA detection based on constrained minimum mean square error criterion according to the present invention.

FIG. 1 is a block diagram depicting an adaptive apparatus for detecting a receiving signal based on constrained minimum mean square error(MMSE) criterion according to the present invention.

FIG. 1 illustrates a preferable configuration of an apparatus for detecting a receiving signal, when a signal is transmitted by a CDMA sending apparatus using a pilot symbol aided binary phase shift key (BPSK) method.

In the FIG. 1, 110 indicates an adaptive filtering part, 120 indicates a channel estimating part, 130 indicates a signal restoring part, 140 indicates a selecting part, 150 indicates a reference signal generating part, 160 indicates an error calculating part, and 170 indicates a tap weight controlling part.

As described FIG. 1, an adaptive apparatus for detecting a receiving signal according to the present invention comprises an adaptive filtering part 110 whose tap weight is controlled by an output signal of a controlling part 170 as described later for filtering a receiving signal, removing an reference signal included in the receiving signal and extracting a desired signal; a channel estimating part 120 for estimating a phase component and a amplitude component of a particular user channel by using the output signal of the adaptive filtering part 110; a signal restoring part for restoring an original signal from a signal transmitted from a particular user by using the channel estimated signal from the channel estimating part 120 and the filtered signal from the adaptive filtering part 110; a selecting part 140 for selecting and transmitting either the restored signal from the signal restoring part 130 or a known training signal; a reference signal generating part 150 for generating a reference signal by using the channel estimated signal from the channel estimating part 120 and the selected signal from the selecting part 140; an error calculating part 160 for calculating an error between the filtered signal from the adaptive filtering part 110 and the reference signal from the reference signal generating part 150 by comparing the signals; and a tap weight controlling part 170 for controlling the tap weight of the adaptive filtering part 110 based on constrained minimum mean square error(MMSE) criterion.

Figure 2:
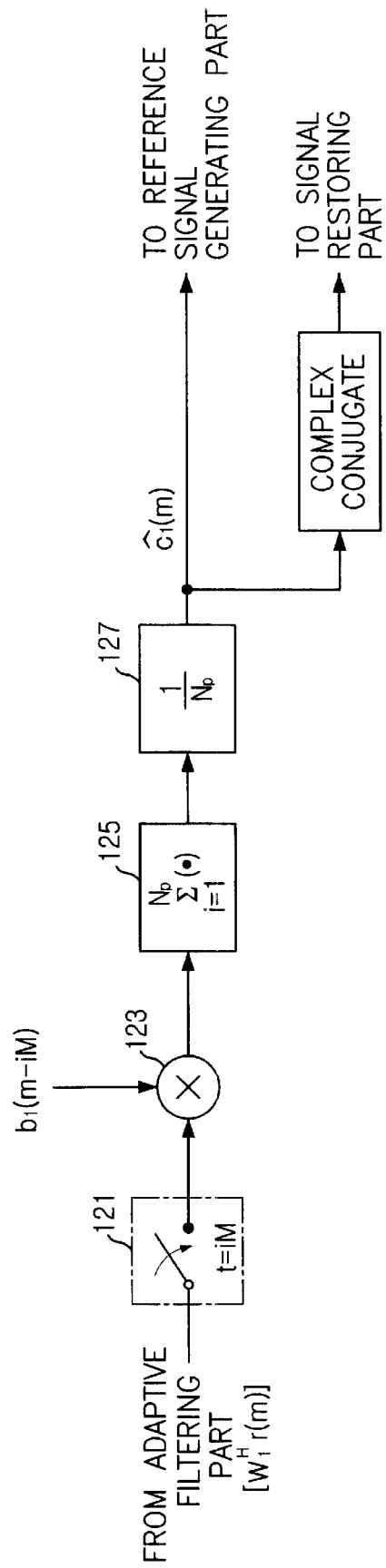
FIG. 2 is a block diagram of the channel estimating part of FIG. 1.
Figure 3:
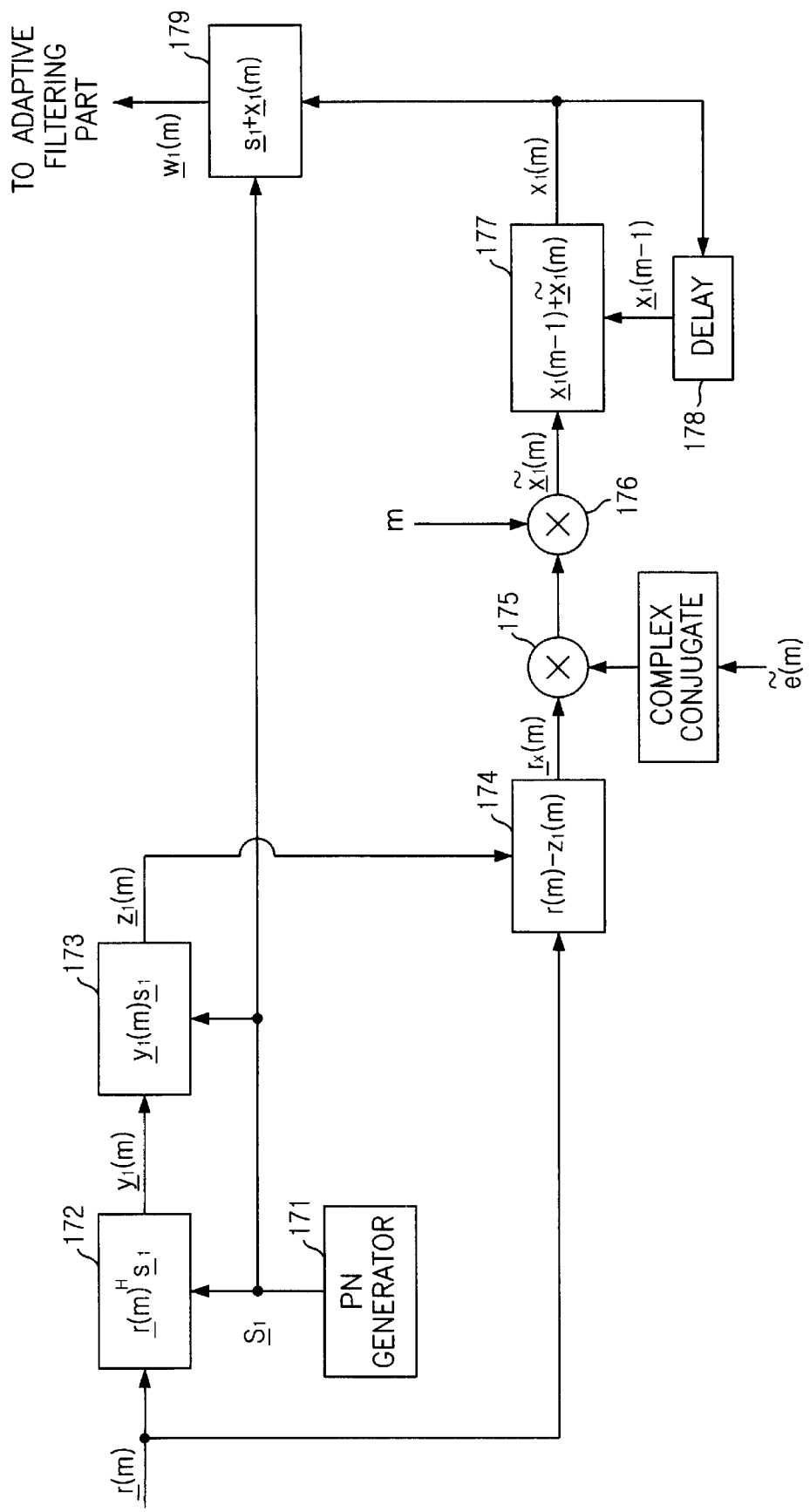
FIG. 3 is a block diagram of the tap weight controlling part of FIG. 1.

Hereafter, with reference to FIGS. 2 and 3, we will describe the detailed configuration of some part and operation of the above adaptive apparatus for detecting a receiving signal.

A receiving signal may include a transmitted signal from multiple users, in here, we assume that a receiving signal includes the transmitted signal from the first user of the users.

As known to FIG. 2, a complex receiving signal $\underline{r}(m)$ is inputted to the adaptive filtering part 110 and is multiplied by a tap weight $\underline{w}(m)$. The channel estimating part 120 estimates a channel by using the output signal of the adaptive filtering part 110, then estimates a phase component $\hat{\phi}_1(m)$ and an amplitude component $\hat{\alpha}_1(m)$.

FIG. 2 is a block diagram of the channel estimating part 120 of FIG. 1.

As described FIG. 2, the channel estimating part 120 comprises: a pilot signal extractor 121 for extracting a known pilot signal with a predetermined period included in the filtered receiving signal from the adaptive filtering part 110; a operator 123 multiplying the pilot signal by a predetermined value; a operator 125 for finding a sum of the output values from the operator 123 in a predetermined period; and a operator 127 for finding and outputting the mean by dividing the sum from the operator 123 into the number of output from the operator 121. And, the operator 127 provides the operated signal to the reference generating part 150 and provides a complex conjugate of the operated signal to the signal restoring part 130.

The signal restoring part 130 comprises: a operator 131 for receiving and multiplying the complex conjugated output signal (it is reverse phase information $-\hat{\phi}_1(m)$ of the channel estimated by the channel estimating part 120) of the channel estimating part 120 by the filtered complex receiving signal of the adaptive filtering part 110; a real value extractor 132 for extracting a real component from the multiplied value from the operator 131; and a bit value determiner 133 for determining a bit value of the extracted real value from the real value extractor 132.

The reverse phase information $-\hat{\phi}_1(m)$ estimated by the channel estimating part 120 is multiplied by the output signal of the adaptive filtering part 110 via the operator 131 and is outputted in form of complex. As the result, a real component of the output is extracted by the real value extractor 132 and is applied to the bit value determiner 133.

And, the bit value determiner 133 determines the extracted real value as "1" if the value is larger than "0", otherwise, determines the extracted real value as "0", then, restores the transmitted signal from the first user.

The selecting part 140 selects a known training data and transmits it to the reference generating part 150 in a tap weight period of a predetermined range, while it selects a bit value data outputted from the bit value determiner 133 and transmits it to the reference generating part 150 in the other periods.

As described above, a training data for a tap weight is generally needed in detecting a received signal of an adaptive apparatus. However, since the present invention uses a pilot symbol transmitted from a sending apparatus as the training data of the tap weight, it need not make and provide another training data like a conventional signal processing apparatus for adaptive receiving system.

The reference signal generating part 150 multiplies the phase component $\hat{\phi}_1(m)$ and an amplitude component $\hat{\alpha}_1(m)$ of the estimated channel from the channel estimating part 120 by the selected signal from the selecting part 140, outputs the result signal to the error calculating part 160 as a reference signal.

The error calculating part 160 calculates the error between the reference signal and the filtered complex receiving signal, provides the result as an error signal $\hat{e}(m)$. The tap weight controlling part 170 controls the tap weight to minimize the size of the error signal $\bar{e}(m)$ detected by the error calculating part 160, provides it to the adaptive filtering part 110.

If the tap weight controlling part 170 changes the tap weight $\underline{w}(m)$ of the adaptive filtering part 110 by using a prior LMS algorithm, the change of the tap weight is expressed by an equation (1):

$$\underline{w}_1(m) = \underline{w}_1(m-1) + \mu \tilde{e}(m)\underline{r}(m)$$

Where the $\underline{w}(m)$ indicates a tap weight vector, $\underline{r}(m)$ indicates a receiving signal vector, and $\mu$ indicates a step size determining speed for changing the tap weight of the adaptive filtering part 110, $\tilde{e}(m)$ indicates a calculated error by the error calculating part 160, and the superscript * indicates complex conjugate respectively.

However, as described above, when a prior tap weight adaptive algorithm like the equation (1) is used to an adaptive apparatus for detecting a receiving signal, the tap weight of the adaptive filtering part 110 converges to "0". thus, the prior LMS algorithm cannot be used at the an adaptive apparatus for detecting a receiving signal, if we intend to use the prior LMS, we must input the unfiltered input signal of the adaptive filtering part 110 instead of the filtered signal of the adaptive filtering part 110. But, such a change makes the performance of an adaptive apparatus for detecting a receiving signal decreased remarkably. Thus, the present invention employs the constrained MMSE criterion expressed by equation (2) as adaptive algorithm of the adaptive filtering part 110.

FIG. 3 is a black diagram of the tap weight controlling part 170.

As described FIG. 3, the tap weight controlling part 170 of the present invention comprises: a pseudo noise(PN) generator 171 for providing a psuedo noise(PN) signal; a operator 172 for multiplying the PN signal from the PN generator 171 by the complex receiving signal; a operator 173 for multiplying the PN signal by the output signal of the operator 172; a operator 174 for subtracting the output signal of the operator 173 from the receiving signal; a operator 175 for multiplying the complex conjugate of the error signal from the error calculating part 160 by the output signal of the operator 174; a operator 176 for multiplying the step size determining the controlling period of the tap weight by the output signal of the operator 175; a operator 177 for adding an operated output signal immediately before to the output signal of the operator 176; the operator 179 for adding the sum of the PN signals to the output signal of the operator 177, and providing the added value to the adaptive filtering part as a new tap weight.

The constrained MMSE criterion according to the present invention is expressed by an equation (2):

$$J = E(|\hat{c}_1(m)d_1(m) - \underline{w}(m)^H \underline{r}(m)|^2) \text{Subject to } \underline{w}(m)^H \underline{s}_1 = 1$$

where J indicates constrained minimum mean square error criterion, E indicates a mean value, $\hat{c}_1(m)$ (it may be expressed by $\hat{c}_1(m) = \hat{a}_1(m)\exp^{j\hat{\phi}_1(m)}$) indicates the estimated channel from the channel estimating part 120, $d_1(m)$ indicates the output signal from the selecting part 140, $\underline{w}(m)$ indicates a tap weight vector, $\underline{s}_1$ indicates a spreading code vector, and the subscript H indicates Hermitian operation.

The constrained MMSE criterion of the equation (2) may be implemented by using an orthogonal decomposition method. If the orthogonal decomposition method is used, the tap weight $\underline{w}(m)$ of the adaptive filtering part 110 is expressed by equation (3):

$$\underline{w}(m) = \underline{s}_1 + \underline{x}(m)$$

where the $\underline{s}_1$ indicates a spreading code vector, the $\underline{x}(m)$ indicates an adaptive component of tap weight vector, and two vectors are orthogonal. Accordingly, the multiplication of the tap weight vector by the spreading code vector ($\underline{w}(m)^H \underline{s}_1$) is expressed by equation (4):

$$\underline{w}(m)^H \underline{s}_1 = (\underline{s}_1 + \underline{x}(m))^H \underline{s}_1 = \underline{s}_1^H \underline{s}_1 = \|\underline{s}_1\|^2$$

where the multiplication $\|\underline{s}_1\|^2$ of the spread code vector is normalized to "1" (i.e. $\underline{w}(m)^H \underline{s}_1 = 1$). Consequently, the constrained MMSE criterion according to the present invention is expressed by an equation (5):

$$\underline{x}(m)=\underline{x}(m-1)+\mu\cdot\tilde{e}(m)\cdot\underline{r}_x(m)$$

where $\underline{x}(m)$ indicates an adaptive component of the tap weight vector, $\mu$ indicates a step size $\tilde{e}(m)$ indicates the calculated error from the error calculating part 160, $\underline{r}_x(m)$ indicates a receiving signal $\underline{r}(m)$ projected by the adaptive component of the tap weight, and the subscript * indicates a complex conjugate operation. On the other hand, the constrained MMSE criterion may be called as "LMS algorithm of an orthogonal decomposition method"

Figure 4:
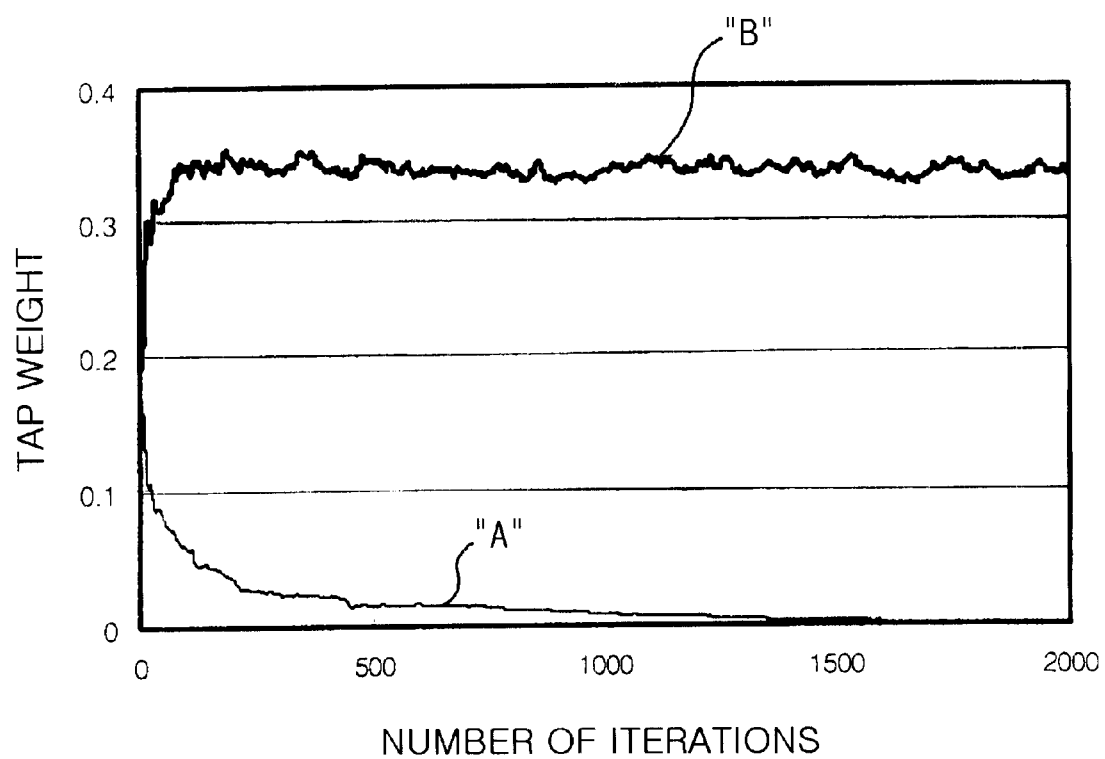
FIG. 4 is a graph showing comparison of the convergence characteristic of a tap weight of an adaptive filtering part in processing a receiving signal according to the present invention with that of a tap weight of an adaptive filter employing a prior art.

Thus, as the apparatus processes a receiving signal successively, the adaptive filtering part 110 is normally operated like FIG. 4(see the "B" in the FIG. 4). The constrained MMSE criterion of the adaptive algorithm according to the present invention has the following characteristics. The first, the algorithm differs from a prior art in that the signal with a simultaneously compensated phase and amplitude is used to a reference signal. Also, by the algorithm, the multiplication of the tap weight $\underline{w}(m)$ of the adaptive filter by the spreading code vector $\underline{s}_1$ is limited to "1" like the equation (2) so that a tap weight does not converge to "0" and the tap weight is controlled by the calculated error between the predetermined reference signal and the filtered receiving signal.

And, if the constrained MMSE criterion is implemented by using orthogonal decomposition-based LMS algorithm like the equation (5), the orthogonal decomposition-based LMS algorithm orthogonal decomposes the tap weight like the equation (3) into an adaptive component orthogonal to a spreading code vector and a spreading code vector component. Also, the algorithm uses the receiving signal projected by the adaptive component orthogonal to the spreading code vector in order to change an adaptive component orthogonal to the spreading code vector.

On the other hand, those skilled in the art could recognize that hardware may be implemented with the element functions of FIGS. 1–3 as well as that the most functions may be replaced by software based on the above description. As described above, since a tap weight of an adaptive filter does not converge to "0" even if a phase and amplitude of an estimated channel being simultaneously compensated by using the output signal of an adaptive filter, the adaptive apparatus for detecting a receiving signal according to the present invention has an improved receiving performance in a fading channel environment. Thus, the present invention can provide a high speed and quality service in radio communication. Also, since one base station can accommodate a number of subscribers, a capacitor of system is increased. Although a preferred embodiment of the present invention has been illustrated and described, various alternatives, modifications and equivalents may be used. Therefore, the foregoing description should not be taken as limiting the scope of the present invention, which is defined by the appended claims.

What is claimed is:

1. An adaptive apparatus for detecting a receiving signal in CDMA communication system comprising:

an adaptive filtering means for filtering a complex receiving signal according to a tap weight controlled by a predetermined period;

a channel estimating means for estimating a phase component and a amplitude component of a particular user channel by using the output signal of the adaptive filtering means;

a signal restoring means for restoring an original signal transmitted from the particular user by using the channel estimated signal from the channel estimating means and the filtered receiving signal from the adaptive filtering means; a selecting means for selecting and providing either the restored signal from the signal restoring means or a known training signal;

a reference signal generating means for generating a reference signal by using the channel estimated signal from the channel estimating means and the selected signal from the selecting means;

an error calculating means for calculating an error between the filtered receiving signal from the adaptive filtering means and the reference signal from the reference signal generating means by comparing the signals; and a tap weight controlling means for controlling the tap weight of the adaptive filtering means based on constrained minimum mean square error(MMSE) criterion.

2. The apparatus of claim 1, wherein the constrained MMSE criterion is expressed by an equation (2), and the multiplication of the tap weight $\underline{w}(m)$ of the adaptive filter means by a spreading code vector $\underline{s}_1$ is practically limited to 1 to minimize the error of the error calculating means, the equation (2) is:

$$J\underline{=}E(|\hat{c}_1(m)d_1(m)-\underline{w}(m)^H\underline{r}(m)|^2)\text{Subject to }\underline{w}(m)^H\underline{s}_1=1$$

where the J indicates constrained minimum mean square error criterion, the E indicates a mean value, $\hat{c}_1(m)$ indicates the estimated channel, the $d_1(m)$ indicates the output signal of the selecting means, the $\underline{w}(m)$ indicates a tap weight vector, the $\underline{r}(m)$ indicates a receiving signal vector, $\underline{s}_1$ indicates the spreading code vector, and the superscript H indicates Hermitian operation.

3. The apparatus of claim 2, wherein the tap weight $\underline{w}(m)$ of adaptive filter is orthogonally decomposed to an adaptive component orthogonal to the spreading code vector and a spreading code vector component like an equation (3), and uses a receiving signal projected by the adaptive component orthogonal to the spreading code vector instead of directly using the receiving signal to change the adaptive component orthogonal to the spreading code vector, the equation (3) is:

$$\underline{w}(m)\underline{=}\underline{s}_1+\underline{x}(m)$$

where the $\underline{S}_1$ indicates the spreading code vector, $\underline{x}(m)$ indicates the adaptive component of a tap weight vector, and two vectors are orthogonal.

4. The apparatus of claim 3, wherein the constrained MMSE criterion is implemented by an orthogonal decomposition-based LMS algorithm expressed by an equation (5), the equation (5) is:

$$\underline{x}(m)=\underline{x}(m-1)+\mu\cdot\tilde{e}(m)\cdot\underline{r}_x(m)$$

where $\underline{x}(m)$ indicates the adaptive component of a tap weight vector, $\mu$ indicates a step size determining a speed for changing the tap weight, $\tilde{e}(m)$ indicates a calculated error, $\underline{r}_x(m)$ indicates a projected component of the receiving $\underline{r}(m)$ projected to the adaptive component of the tap weight, and the superscript * indicates complex conjugate.

5. The apparatus of claim 1, wherein the channel estimating means comprises:

a pilot signal extracting means for extracting the known pilot signal with a predetermined period included in the filtered receiving signal from the adaptive filtering means; a first operation means for multiplying the pilot signal by a predetermined value;

a second operation means for finding a sum of output values from the first operation means in a predetermined period; and a third operation means for finding and outputting the mean by dividing the sum from the second operation means into the number of output from the first operation means.

6. The apparatus of claim 5, wherein the channel estimating means provides the output signal of the third operation means to the reference signal generating means and provides a complex conjugate of output signal of the third operation means to the signal restoring means.

7. The apparatus of claim 5, wherein the signal restoring means comprises:

a forth operating means for multiplying the output of the channel estimating means by the output signal of the adaptive filtering means;

a real value extracting means for extracting a real component from the output value of the forth operation means; and a bit value determining means for determining a bit value of the extracted real value from the real value extracting means.

8. The apparatus of claim 7, wherein the reference generating means comprises a fifth operation means for multiplying the channel estimated value from the channel estimating means by the selected signal from the selecting means.

9. The apparatus of claim 8, wherein the error calculating means comprises a sixth operating means for adding the output signal of the adaptive filtering means to the reference signal from the reference generating means.

10. The apparatus of claim 9, wherein the tap weight controlling means comprises:

a pseudo noise(PN) generating means for providing a pseudo noise(PN);

a seventh operating means for multiplying the PN signal from the PN generating noise by the receiving signal;

a eighth operating means for multiplying the PN signal by the output signal of the seventh operating means;

a ninth operating means for subtracting the output signal of the eighth operating means from the receiving signal;

a tenth operating means for multiplying the complex conjugate of the error signal from the error calculating means by the output signal of the ninth operating means;

a eleventh operating means for multiplying the step size determining the controlling period of the tap weight by the output signal of the tenth operating means;

a twelfth operating means for adding an operated output signal immediately before to the output signal of the ninth operating means; and a thirteenth operation means for adding the sum of the PN signal to the output signal of the twelfth operating means, and providing the added value to the adaptive filtering means as a new tap weight.

11. An adaptive method for detecting a receiving signal in CDMA communication system comprising the steps of:

a first step for removing an interference signal from a receiving signal according to a tap weight of an adaptive filter controlled by a predetermined period;

a second step for estimating a phase component and amplitude component of a particular user channel by using the filtered complex receiving signal;

a third step for restoring an original signal transmitted from the particular user from the filtered complex receiving signal by using the channel estimated value of the second step, wherein the filtered complex receiving signal is estimated as a receiving a signal transmitted from the particular user;

a fourth step for selecting and providing either the restored signal from the third step or a known training signal;

a fifth step for generating a reference signal by using the channel estimated signal from the second step and the selected signal from the fourth step;

a sixth step for calculating an error between the filtered complex receiving signal and the reference signal by comparing the signals; and a seventh step for re-establishing the tap weight of the adaptive filter based on constrained minimum mean square error (MMSE) criterion, then iterating the steps from the first step.

12. The method of claim 11, wherein the constrained MMSE criterion is expressed by an equation (2), and multiplication of the tap weight $\underline{w}(m)$ of the adaptive filter and a spreading code vector $\underline{s}_1$ is practically limited to 1 to minimize the calculated error from the error calculating step, the equation (2) is:

$$J=E(|\hat{c}_1(m)d_1(m)-\underline{w}(m)^H\underline{r}(m)|^2) \text{Subject to } \underline{w}(m)^H\underline{s}_1=1$$

where the J indicates constrained minimum mean square error criterion, the E indicates a mean value, the $\hat{c}_1(m)$ indicates the estimated channel, the $d_1(m)$ indicates the output signal of the fourth step, the $\underline{w}(m)$ indicates a tap weight vector, the $\underline{r}(m)$ indicates a receiving signal vector, the $\underline{s}_1$ indicates a spreading code vector, and the superscript H indicates Hermitian operation.

13. The method of claim 12, wherein the tap weight $\underline{w}(m)$ of adaptive filter is orthogonally decomposed to an adaptive component orthogonal to the spreading code vector and a spreading code vector component like an equation (3), and uses a receiving signal projected by the adaptive component orthogonal to the spreading code vector instead of directly using the receiving signal to change the adaptive component orthogonal to the spreading code vector, the equation (3) is:

$$\underline{w}(m)=\underline{s}_1+\underline{x}(m)$$

where the $\underline{s}_1$ indicates the spreading code vector, $\underline{x}(m)$ indicates the adaptive component of a tap weight vector, and two vectors are orthogonal.

14. The method of claim 13, wherein the constrained MMSE criterions is implemented by an orthogonal decomposition-based LMS algorithm expressed by an equation (5), the equation (5) is:

$$\underline{x}(m)=\underline{x}(m-1)+\mu \cdot \tilde{e}(m) \cdot \underline{r}_x(m)$$

where $\underline{x}(m)$ indicates the adaptive component of a tap weight vector, $\mu$ indicates a step size determining a speed for changing the tap weight, $\tilde{e}(m)$ indicates a calculated error, $\underline{r}_x(m)$ indicates a projected component of the receiving $\underline{r}(m)$ projected to the adaptive component of the tap weight, and the superscript * indicates complex conjugate.

15. The method of claim 11, wherein the second step comprises the steps of:

a pilot signal extracting step for extracting a known pilot signal with a predetermined period included in the filtered receiving signal from the first step;

a first operating step for multiplying the pilot signal by a predetermined value;

a second operating step for adding all the output values of the first operating step in a predetermined period; and a third operating step for finding and outputting the mean by dividing the sum of the second operating step into the number of output value of the first operating step.

16. The method of claim 15, wherein the third step comprises the steps of:

a fourth operating step for multiplying the output signal of the second step by the output signal of the first step;

a real value extracting step for extracting a real component from the output value of the fourth step; and a bit value determining step for determining a bit value of the extracted real value from the real value-extracting step.

17. The method of claim 16, wherein the seventh step comprises the steps of:

a pseudo noise(PN) generating step for providing a pseudo noise(PN);

a fifth operating step for multiplying the receiving signal by the PN signal;

a sixth operating step for multiplying the output signal of the fifth operating step by the PN signal;

a seventh operating step for subtracting the output signal of the sixth operating step from the receiving signal;

a eighth operating step for multiplying the complex conjugate of the error signal from the sixth operating step by the output signal of the seventh operating step;

a ninth operating step for multiplying the step size determining the controlling period of the tap weight by the output signal of the eighth operating step;

a tenth operating step for adding the operated output signal immediately before to the output signal of the ninth operating step; and a eleventh operation step for adding the PN signal to the output signal of the tenth operating step, and providing the sum to the adaptive filter as a new tap weight.

18. A recording media read by a computer, in which is recorded with a program for implementing functions in a signal processing apparatus for adaptive receiving system in CDMA communication system including a processor, the functions comprising:

a first function for removing an interference signal from a receiving signal according to a tap weight of an adaptive filter controlled by a predetermined period;

a second function for estimating a phase component and amplitude component of a particular user channel by using the filtered complex receiving signal;

a third function for restoring an original signal transmitted from the particular user from the filtered complex receiving signal by using the channel estimated value of the second function, wherein the filtered complex receiving signal is estimated as a receiving signal transmitted from the particular user;

a fourth function for selecting and providing either the restored signal by the third function or a known training signal;

a fifth function for generating a reference signal by using the channel estimated signal performed by the second function and the selected signal by the fourth function;

a sixth function for calculating an error between the filtered complex receiving signal and the reference signal by comparing the signals; and a seventh function for re-establishing the tap weight of the adaptive filter based on constrained minimum mean square error (MMSE) criterion, then iterating the functions from the first function.

19. The recording media of claim 18, wherein the constrained MMSE criterions is expressed by an equation (2), and multiplication of the tap weight $\underline{w}(m)$ of the adaptive filter and a spreading code vector $\underline{S}_1(m)$ is practically limited to 1 to minimize the calculated error from the error calculating function, the equation (2) is:

$$J=E(|\tilde{c}_1(m)d_1(m)-\underline{w}(m)^H\underline{r}(m)|^2) \text{Subject to } \underline{w}(m)^H\underline{s}_1=1$$

where the J indicates constrained minimum mean square error criterion, the E indicates a mean value, $\tilde{c}_1(m)$ indicates the estimated channel, the $d_1(m)$ indicates the output signal of the fourth step, the $\underline{w}(m)$ indicates a tap weight vector, the $\underline{r}(m)$ indicates a receiving signal vector, the $\underline{s}_1$ indicates a spreading code vector, and the superscript H indicates Hermitian operation.

20. The recording media of claim 19, wherein the tap weight $\underline{w}(m)$ of adaptive filter is orthogonally decomposed to an adaptive component orthogonal to the spreading code vector and a spreading code vector component like an equation (3), and uses a receiving signal projected by the adaptive component orthogonal to the spreading code vector instead of directly using the receiving signal to change the adaptive component orthogonal to the spreading code vector, the equation (3) is:

$$\underline{w}(m)=\underline{s}_1+\underline{x}(m)$$

where the $\underline{s}_1$ indicated the spreading code vector, $\underline{x}(m)$ indicates the adaptive component of a tap weight vector, and two vectors are orthogonal.

21. The recording media of claim 20, wherein the constrained MMSE criterion is implemented by an orthogonal decomposition-based LMS algorithm expressed by an equation (5), the equation (5) is:

$$\underline{x}(m)=\underline{x}(m-1)+\mu\tilde{e}(m)\cdot\underline{r}_x(m)$$

where $\underline{x}(m)$ indicates the adaptive component of a tap weight vector, $\mu$ indicates a step size determining a speed for changing the tap weight, $\tilde{e}(m)$ indicates a calculated error, $\underline{r}_x(m)$ indicates a projected component of the receiving $\underline{r}(m)$ projected to the adaptive component of the tap weight, and the superscript * indicates complex conjugate.

* * * * *